(12) United States Patent
Anderson

(10) Patent No.: US 12,207,637 B1
(45) Date of Patent: Jan. 28, 2025

(54) PORTABLE ROD HOLDER ASSEMBLY

(71) Applicant: Vincent Anderson, Paris, TN (US)

(72) Inventor: Vincent Anderson, Paris, TN (US)

( * ) Notice: Subject to any disclaimer, the term of this patent is extended or adjusted under 35 U.S.C. 154(b) by 0 days.

(21) Appl. No.: 18/368,118

(22) Filed: Sep. 14, 2023

(51) Int. Cl.
*A01K 97/10* (2006.01)
*A01K 97/20* (2006.01)
*A01K 97/22* (2006.01)
*A45F 3/08* (2006.01)
*A45F 4/02* (2006.01)

(52) U.S. Cl.
CPC .............. *A01K 97/10* (2013.01); *A01K 97/20* (2013.01); *A01K 97/22* (2013.01); *A45F 3/08* (2013.01); *A45F 2004/026* (2013.01)

(58) Field of Classification Search
CPC ........ A01K 97/10; A01K 97/20; A01K 97/22; A45F 3/08; A45F 2004/026
See application file for complete search history.

(56) References Cited

U.S. PATENT DOCUMENTS

| | | | | |
|---|---|---|---|---|
| 1,635,928 A | * | 7/1927 | Davis | A01K 97/20 224/629 |
| 2,712,404 A | * | 7/1955 | Miller | A45F 3/08 224/270 |
| 2,822,117 A | * | 2/1958 | Mack | A47D 13/025 224/161 |
| 3,127,077 A | * | 3/1964 | Faro | A45F 3/08 224/629 |
| 3,550,997 A | * | 12/1970 | Strand | A45F 4/02 280/30 |
| 3,603,019 A | * | 9/1971 | Smeltzer | A01K 97/10 43/56 |
| 3,659,369 A | * | 5/1972 | Hermanson | A01K 97/10 220/735 |
| 4,228,894 A | * | 10/1980 | Lyles | A01K 97/22 220/500 |
| 4,972,981 A | | 11/1990 | Gex | |
| 5,159,777 A | * | 11/1992 | Gonzalez | A01K 97/08 280/47.29 |
| 5,275,316 A | | 1/1994 | Kish | |
| 5,409,291 A | | 4/1995 | Lamb | |
| 5,634,291 A | * | 6/1997 | Pham | A01K 97/05 43/56 |
| 5,692,335 A | * | 12/1997 | Magnuson | A01K 97/22 297/188.1 |
| 6,082,757 A | | 7/2000 | Lin | |

(Continued)

FOREIGN PATENT DOCUMENTS

CA    5013951    2/1992

*Primary Examiner* — Jessica B Wong

(57) ABSTRACT

A portable rod holder assembly includes a crate and a bucket positionable in the crate for transporting the bucket. A lid is positionable on the bucket for closing the bucket and a cushion is applied to the lid to be set upon by a user. A frame is pivotally attached to the crate and the frame is positionable in a stored position or a deployed position. A plurality of fishing rod holders is each attached to the frame to hold fishing rods. A carrying member is attached to and extends upwardly from the crate and A pair of shoulder straps is each of the pair of shoulder straps is coupled between the carrying member and the crate for wearing over a respective one of the user's shoulders to carry the crate and the frame and the bucket on the user's back in the convention of a backpack.

8 Claims, 6 Drawing Sheets

(56) References Cited

U.S. PATENT DOCUMENTS

| | | | |
|---|---|---|---|
| 6,405,478 B1* | 6/2002 | Westley | A01K 97/10 43/54.1 |
| 6,658,786 B1* | 12/2003 | Williams | A01K 97/10 43/54.1 |
| 6,962,354 B1* | 11/2005 | Miller | A01K 97/08 280/47.26 |
| 8,943,739 B2 | 2/2015 | Blake, III | |
| 9,526,236 B2* | 12/2016 | Coker | A01K 97/08 |
| D828,016 S | 9/2018 | Gillespie | |
| 10,182,653 B1* | 1/2019 | Long | A47B 81/005 |
| D852,927 S | 7/2019 | Olliges | |
| 11,103,073 B1* | 8/2021 | Hertlein | B65D 51/24 |
| 11,147,255 B1* | 10/2021 | Snyder | A01K 97/22 |
| 2005/0284510 A1* | 12/2005 | Rau | A45F 4/04 135/96 |
| 2007/0164063 A1 | 7/2007 | Concepcion | |
| 2007/0205234 A1* | 9/2007 | Lessmann | A45F 4/02 224/652 |
| 2012/0005941 A1* | 1/2012 | Lan | A01K 97/20 43/21.2 |
| 2012/0043358 A1 | 2/2012 | Kelly | |
| 2014/0209646 A1* | 7/2014 | Hoppa | A45F 3/08 224/261 |
| 2016/0143437 A1* | 5/2016 | Gabriel | A45F 3/10 224/153 |
| 2021/0345588 A1* | 11/2021 | Leach | A01K 97/20 |

* cited by examiner

PORTABLE ROD HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rod holder devices and more particularly pertains to a new rod holder device for facilitating fishing rods and a bucket and assorted fishing equipment to be transported to a remote location. The device includes a crate, a bucket that is positionable in the crate and a frame that is pivotally attached to the crate which is positionable between a stored position and a deployed position. The device includes a plurality of fishing rod holders that are attached to the frame and a carrying member and shoulder straps for carrying the crate and the bucket and the frame on a user's back.

(2) Description of Related Art Including Information Disclosed Under 37 CFR 1.97 and 1.98

The prior art relates to rod holder devices including a variety of backpack devices that are each wearable on a user's back for carrying cargo and a variety of fishing backpacks which are structured to carry fishing poles and a cart which has storage tubes for carrying fishing rods. In no instance does the prior art disclose a portable fishing rod holder that includes a crate, a frame pivotally attached to the crate, a plurality of fishing rod holders attached to the frame for holding fishing rods when the frame is in a deployed position and a bucket positionable in the crate for holding fish.

BRIEF SUMMARY OF THE INVENTION

An embodiment of the disclosure meets the needs presented above by generally comprising a crate and a bucket positionable in the crate for transporting the bucket. A lid is positionable on the bucket for closing the bucket and a cushion is applied to the lid to be set upon by a user. A frame is pivotally attached to the crate and the frame is positionable in a stored position or a deployed position. A plurality of fishing rod holders is each attached to the frame to hold fishing rods. A carrying member is attached to and extends upwardly from the crate and A pair of shoulder straps is each of the pair of shoulder straps is coupled between the carrying member and the crate for wearing over a respective one of the user's shoulders to carry the crate and the frame and the bucket on the user's back in the convention of a backpack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
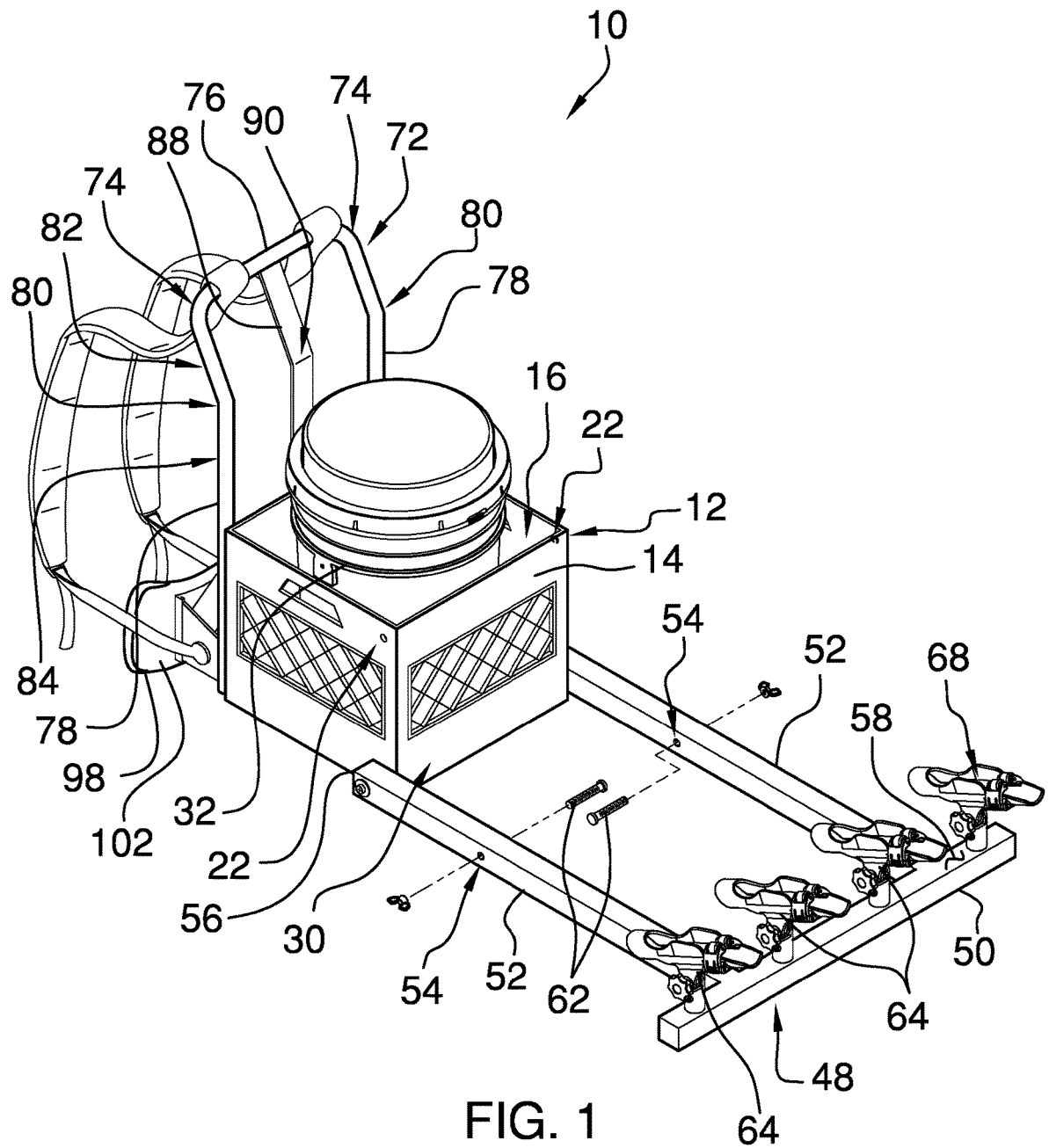
FIG. 1 is a top perspective view of a portable rod holder assembly according to an embodiment of the disclosure.
Figure 2:
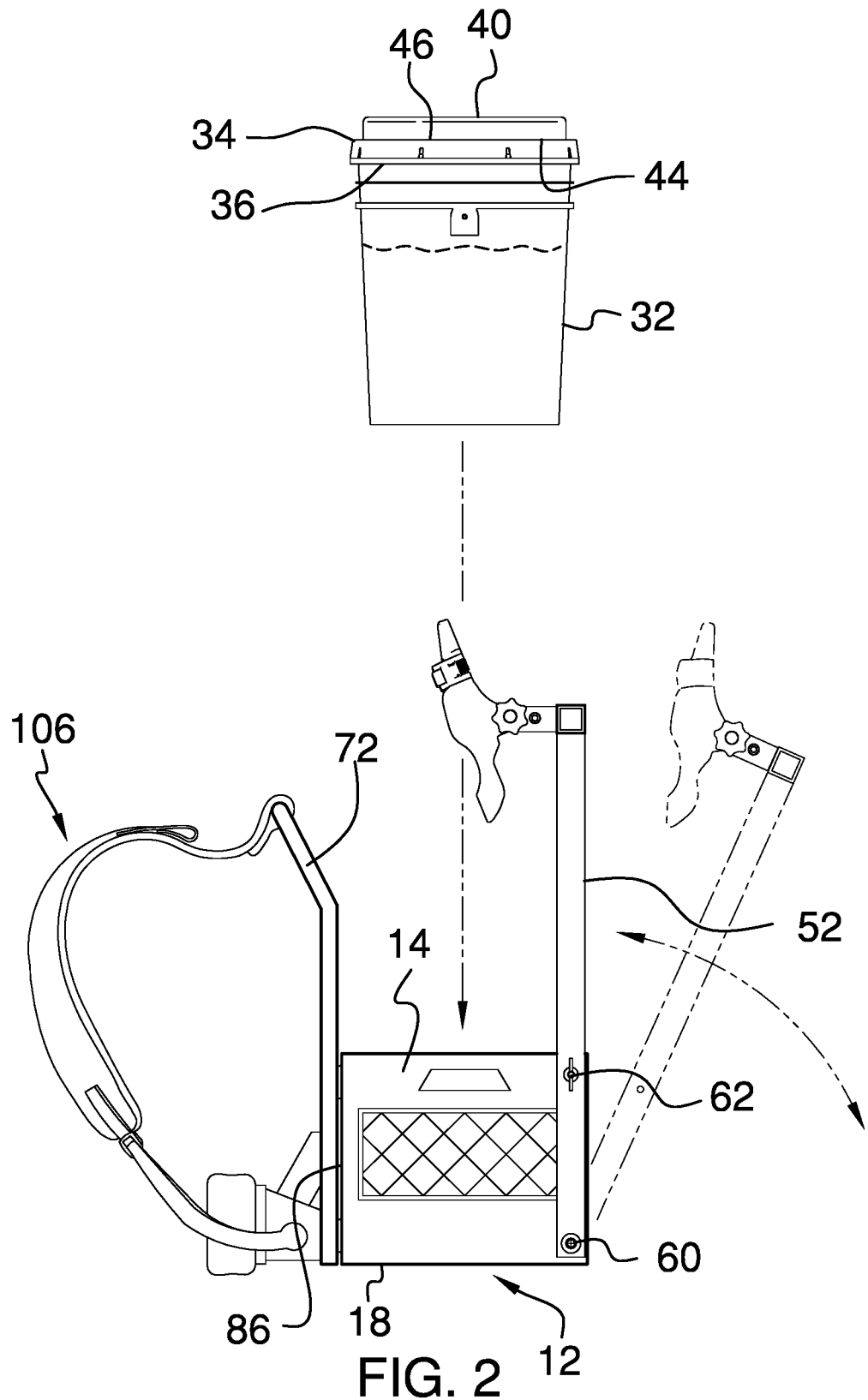
FIG. 2 is a left side view of an embodiment of the disclosure.
Figure 3:
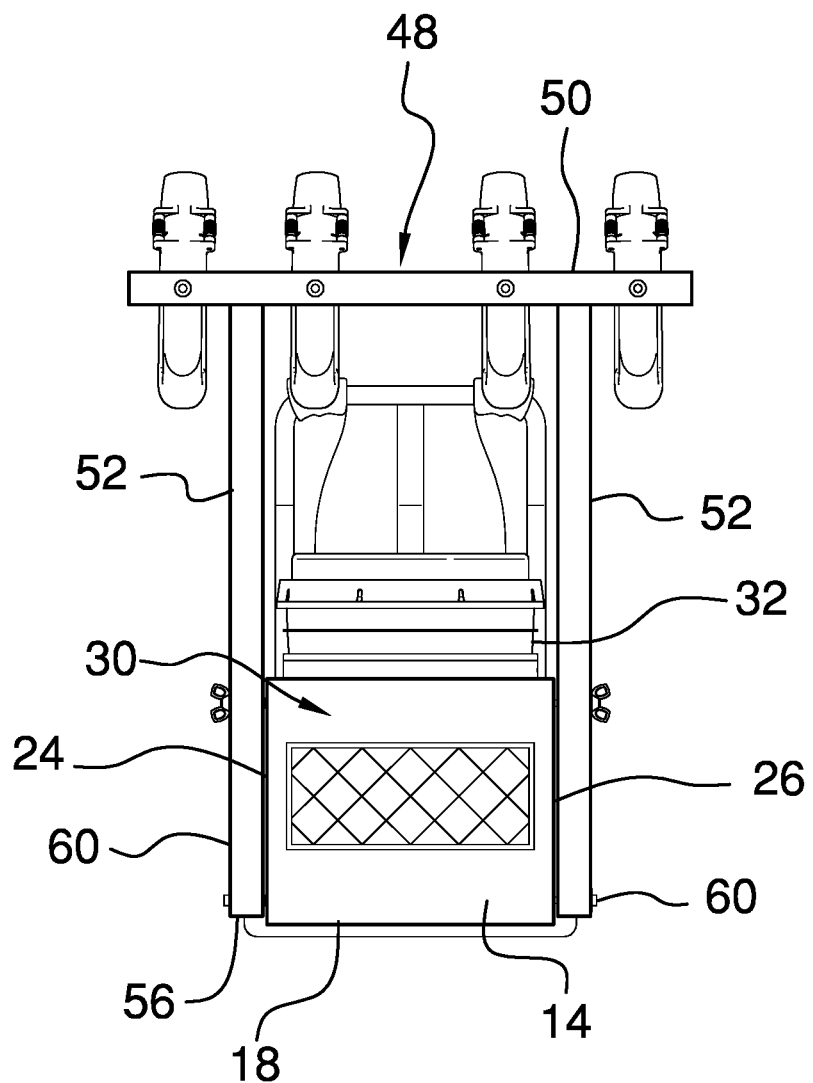
FIG. 3 is a back view of an embodiment of the disclosure.
Figure 4:
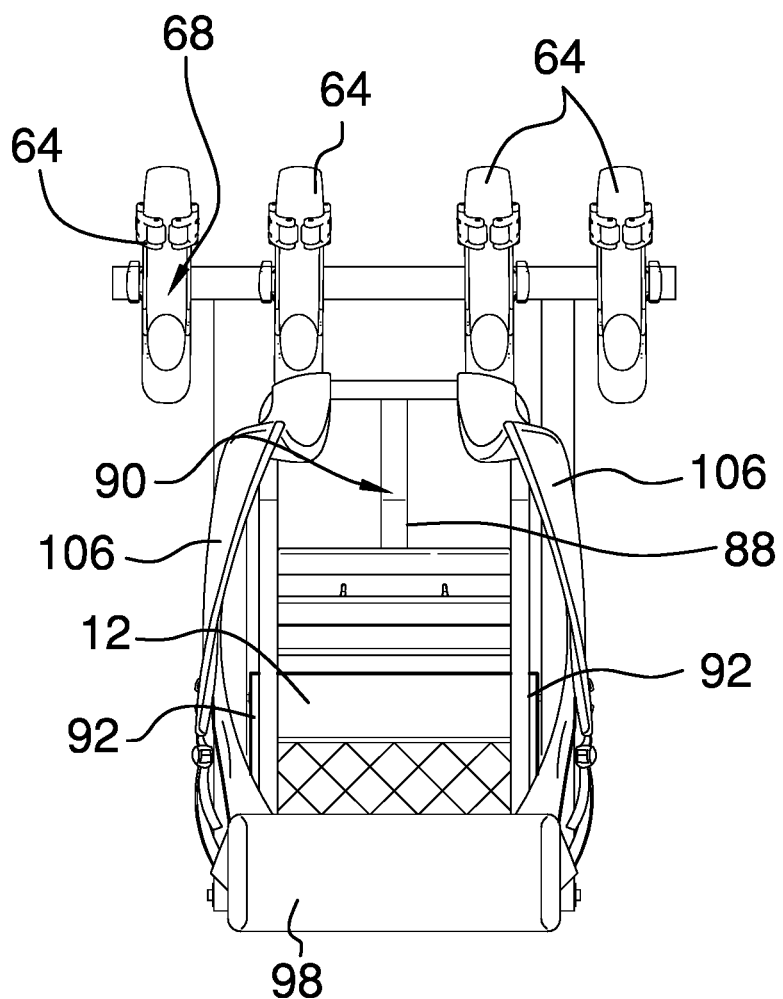
FIG. 4 is a front view of an embodiment of the disclosure.
Figure 5:
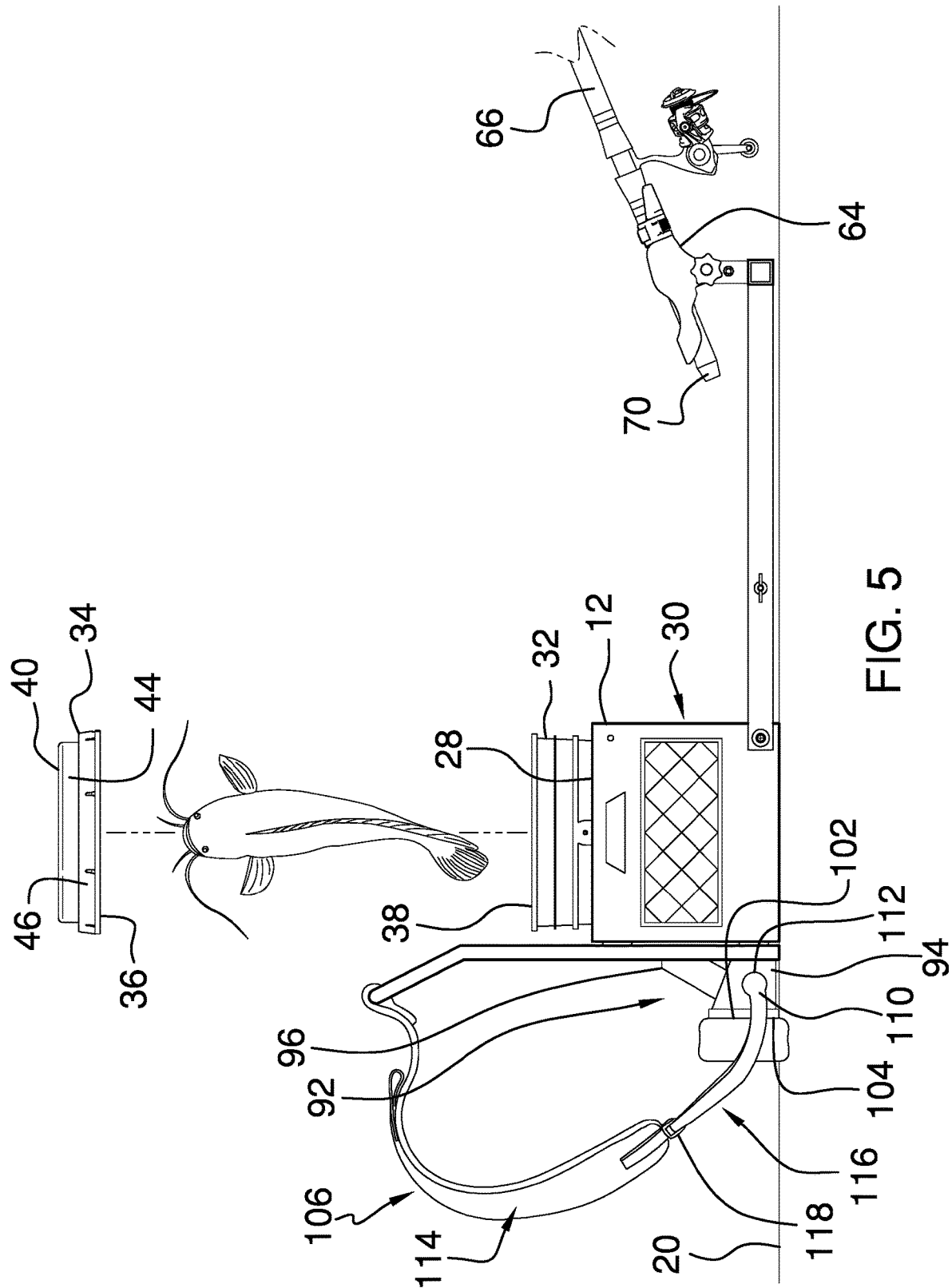
FIG. 5 is a perspective in-use view of an embodiment of the disclosure.
Figure 6:
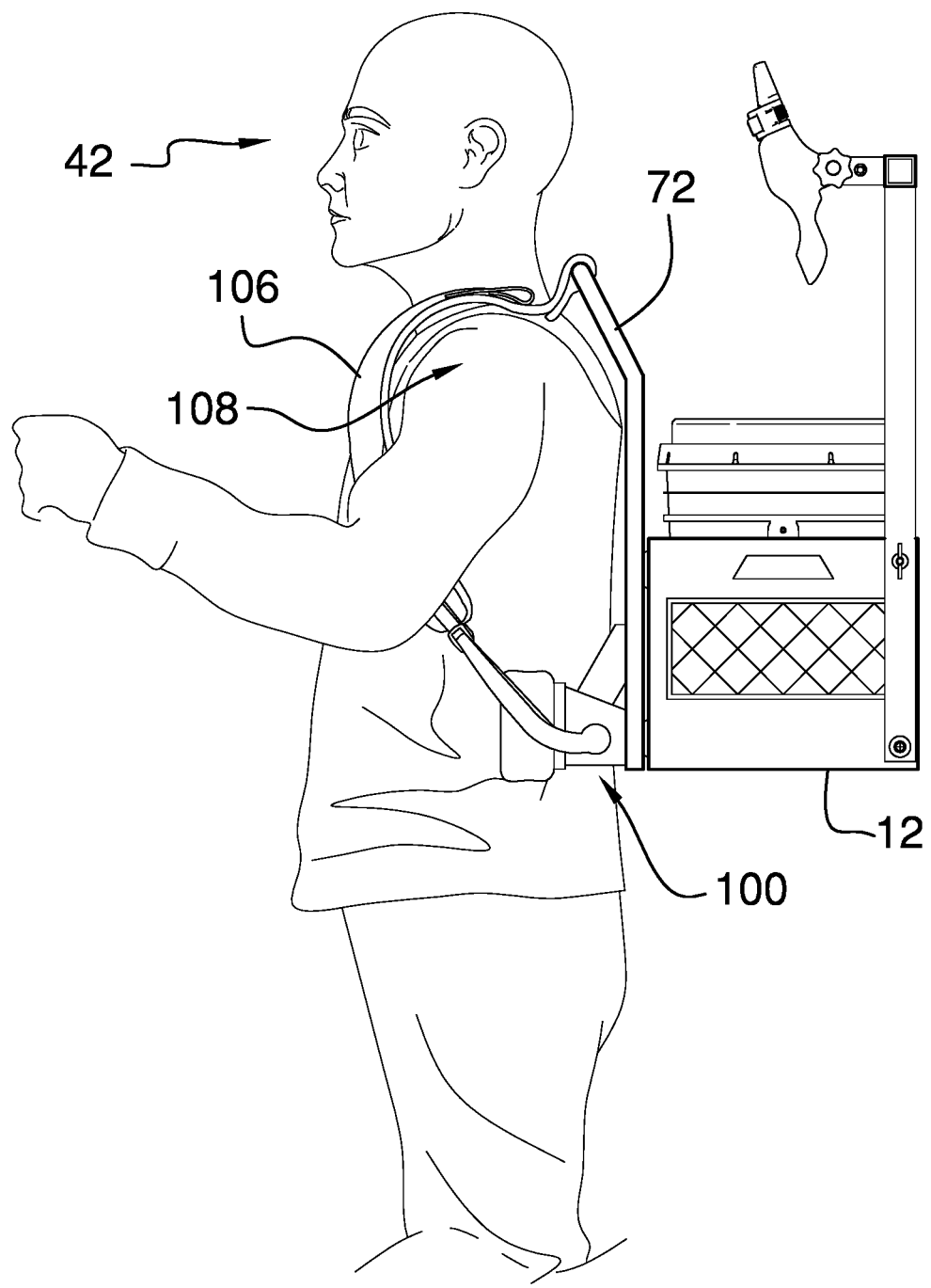
FIG. 6 is a side in-use view of an embodiment of the disclosure.

With reference now to the drawings, and in particular to FIGS. 1 through 6 thereof, a new rod holder device embodying the principles and concepts of an embodiment of the disclosure and generally designated by the reference numeral 10 will be described.

As best illustrated in FIGS. 1 through 6, the portable rod holder assembly 10 generally comprises a crate 12 that has an outer wall 14 defining a storage area 16 in the crate 12 and a bottom wall 18 which can be placed upon a support surface 20. The support surface 20 may be any type of terrain that is encountered while fishing, including but not being limited to, sand, rocks, grass or soil. The crate 12 has a pair of holes 22 each extending through a respective one of a first lateral side 24 and a second lateral side 26 of the outer wall 14. Each of the pair of holes 22 is spaced from a top edge 28 of the outer wall 14 at a point located proximate a front side 30 of the outer wall 14. Additionally, the crate 12 may comprise a milk crate or other type of crate that has a length and a width of less than 60.0 cm.

A bucket 32 is provided and the bucket 32 is positionable in the storage area 16 in the crate 12 for transporting the bucket 32. The bucket 32 is comprised of a fluid impermeable material such that the bucket 32 can be filled with water to facilitate a fish to be contained in the water. Furthermore, the bucket 32 may have a fluid capacity of approximately 19.0 liters. A lid 34 is provided and the lid 34 is positionable on the bucket 32 for closing the bucket 32. The lid 34 has a ring 36 extending around a perimeter of the lid 34 and the ring 36 releasably engages a top edge 38 of the bucket 32 for retaining the lid 34 on the bucket 32. A cushion 40 is applied to the lid 34 such that the cushion 40 can be set upon by a user 42 and the cushion 40 is comprised of a resiliently compressible material to enhance comfort for the user 42. Furthermore, the cushion 40 has a bottom surface 44 that is bonded to an upper surface 46 of the lid 34 having the cushion 40 completely covering the upper surface 46.

A frame 48 is provided and the frame 48 is pivotally attached to the crate 12. The frame 48 is positionable in a stored position having the frame 48 extending upwardly from the crate 12 and the frame 48 is positionable in a deployed position having the frame 48 extending forwardly from the crate 12. The frame 48 comprises a central member 50 which extends between a pair of sidelong members 52 and each of the sidelong members 52 is spaced apart from each other and is perpendicularly oriented with the central member 50. Additionally, the central member 50 extends outwardly beyond each of the pair of sidelong members 52. Each of the pair of sidelong members 52 has a bolt hole 54 extending laterally through a respective sidelong member 52. The bolt hole 54 associated with each of the sidelong members 52 is positioned closer to a distal end 56 of the respective sidelong member 52 than the central member 50. Furthermore, a top surface 58 of the central member 50 is directed upwardly when the frame 48 is in the deployed position.

A pair of pivot fasteners 60 is provided and each of the pivot fasteners 60 extends through a respective one of the sidelong members 52 of the frame 48 and a respective one of the first lateral side 24 and the second lateral side 26 of the outer wall 14 of the crate 12 for pivotally attaching each of the pair of sidelong members 52 to the outer wall 14. Each of the pivot fasteners 60 is positioned adjacent to the distal end 56 of the respective sidelong member 52. Additionally, each of the pivot fasteners 60 engages the outer wall 14 of the crate 12 at a point located proximate an intersection between the bottom wall 18 of the crate 12 and the front side 30 of the outer wall 14 of the crate 12. Each of the pivot fasteners 60 may comprise a screw, a bolt or other type of threaded fastener.

A pair of securing fasteners 62 is provided and each of the securing fasteners 62 is extendable through the bolt hole 54 in a respective one of the sidelong members 52 of the frame 48 and a respective one of the holes 22 in the outer wall 14 of the crate 12 when the frame 48 is in the stored position for retaining the frame 48 in the stored position. Conversely, the frame 48 is positionable in the deployed position when the pair of securing fasteners 62 is removed from the bolt hole 54 in the respective sidelong member 52. Each of the pair of securing fasteners 62 may comprise a bolt and nut or other type of multiple use, releasable fastener.

A plurality of fishing rod holders 64 is each attached to the frame 48 to hold a fishing rod 66 when the frame 48 is positioned in the deployed position. Each of the plurality of fishing rod holders 64 is positioned on the top surface 58 of the central member 50 of the frame 48. The fishing rod holders 64 are spaced apart from each other and are evenly distributed along the central member 50. Additionally, each of the fishing rod holders 64 might include a saddle 68 for receiving a handle 70 of the fishing rod 66. Each of the plurality of fishing rod holders 64 may comprise a fishing rod holder of any conventional design.

A carrying member 72 is provided and the carrying member 72 is attached to and extends upwardly from the crate 12. The carrying member 72 has a pair of first bends 74 positioned on opposing sides of a middle of the carrying member 72 to define a central portion 76 of the carrying member 72 that is perpendicularly oriented with a pair of outward portions 78 of the carrying member 72. The carrying member 72 has a pair of second bends 80 which is integrated into a respective one of the outward portions 78 to define an upper section 82 of each of the outward portions 78 angling away from a lower section 84 of each of the outward portions 78. The central portion 76 is associated with the upper section 82 of each of the outward portion. The lower section 84 of each of the outward portions 78 rests against a back side 86 of the outer wall 14 of the crate 12 having each of the outward portions 78 extending upwardly from the crate 12. Additionally, the upper section 82 of each of the outward portions 78 angles rearwardly from the crate 12 having the central portion 76 being spaced upwardly from the crate 12.

A center support 88 is coupled between the central portion 76 of the carrying member 72 and the back side 86 of the outer wall 14 of the crate 12. The center support 88 has a bend 90 that is aligned with each of the first bends 74 in the pair of outward portions 78 of the carrying member 72. A pair of brackets 92 is provided and each of the pair of brackets 92 is attached to and extends away from the crate 12. Each of the pair of brackets 92 has a first panel 94 which is attached to and extends rearwardly from the back side 86 of the outer wall 14 of the crate 12 at a point located adjacent to the bottom wall 18 of the crate 12. Each of the pair of brackets 92 includes a second panel 96 which extends upwardly and angles rearwardly from the first panel 94 having the second panel 96 being attached to the back side 86 of the outer wall 14. Additionally, each of the pair of brackets 92 is positioned adjacent to an intersection between the bottom wall 18 of the crate 12 and a respective one of the first lateral side 24 and the second lateral side 26 of the outer wall 14 of the crate 12.

A kidney pad 98 is attached to each of the pair of brackets 92 such that the kidney pad 98 rests against the user's back 100 when the crate 12 is being carried by the user 42. The kidney pad 98 has a back side 102 that is attached to a free end 104 of the first panel 94 of each of the brackets 92. A pair of shoulder straps 106 is provided and each of the pair of shoulder straps 106 is coupled between the carrying member 72 and the kidney pad 98. In this way each of the pair of shoulder straps 106 can be worn over a respective one of the user's shoulders 108 thereby facilitating the crate 12 and the bucket 32 and the frame 48 to be carried on the user's back 100 in the convention of a backpack. Each of the shoulder straps 106 is wrapped around the central portion 76 of the carrying member 72 in a fixed manner and each of the shoulder straps 106 has a lower end 110 which is attached to a connection point 112 integrated into the first panel 94 of a respective one pair of brackets 92. Each of the pair of shoulder straps 106 may include an upper portion 114 comprised of a resiliently compressible material for enhancing comfort for the user 42 and a lower portion 116 that is releasably attached to the upper portion 114 with a buckle 118 or the like.

In use, the frame 48 is positioned in the stored position, each of the securing fasteners 62 is extended through the frame 48 and the crate 12 to secure the frame 48 in the stored position, the bucket 32 is positioned in the crate 12 and the shoulder straps 106 are worn over the user's shoulders 108 for carrying the crate 12, bucket 32 and frame 48. The crate 12 is laid on the ground when the user 42 reaches a location in which they intend to fish, each of the securing fasteners 62 is removed from the frame 48 and the frame 48 is pivoted into the deployed position. The bucket 32 is filled with water to facilitate the weight of the water to inhibit the crate 12 from sliding on the ground and each of the fishing rods 66 is positioned in a respective one of the fishing rod holders 64 and to facilitate a fish to remain alive when the fish is placed in the bucket 32. Furthermore, the user 42 can sit on the cushion 40 on the lid 34 of the bucket 32 while the user 42 is waiting for a fish to strike on one of the fishing poles. In this way the plurality of fishing rods 66 can be retained in a preferred orientation while fishing and the user 42 can relax in a seated position while the user 42 is fishing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable rod holder assembly for facilitating a plurality of fishing rods to be supported in a remote location during fishing, said assembly comprising:
   a crate having an outer wall defining a storage area in said crate and a bottom wall being configured to be placed upon a support surface;
   a bucket being positionable in said storage area in said crate for transporting said bucket, said bucket being comprised of a fluid impermeable material wherein said bucket is configured to be filled with water to facilitate a fish to be contained in the water;
   a lid being positionable on said bucket for closing said bucket;
   a cushion being applied to said lid wherein said cushion is configured to be set upon by a user, said cushion being comprised of a resiliently compressible material wherein said cushion is configured to enhance comfort for the user;
   a frame being pivotally attached to said crate, said frame being positionable in a stored position having said frame extending upwardly from said crate, said frame being positionable in a deployed position having said frame extending forwardly from said crate;
   a plurality of fishing rod holders, each of said plurality of fishing rod holders being attached to said frame wherein each of said plurality of fishing rod holders is configured to hold a fishing rod when said frame is positioned in said deployed position;
   a carrying member being attached to and extending upwardly from said crate;
   a pair of brackets, each of said pair of brackets being attached to and extending away from said crate;
   a kidney pad being attached to each of said pair of brackets wherein said kidney pad is configured to rest against a user's back when said crate is being carried by the user; and
   a pair of shoulder straps, each of said pair of shoulder straps being coupled between said carrying member and said kidney pad wherein each of said pair of shoulder straps is configured to be worn over a respective one of the user's shoulders thereby facilitating said crate and said bucket and said frame to be carried on the user's back in the convention of a backpack.

2. The assembly according to claim 1, wherein:
   said crate has a pair of holes each extends through a respective one of a first lateral side and a second lateral side of said outer wall, each of said pair of holes being spaced from a top edge of said outer wall at a point located proximate a front side of said outer wall;
   said frame includes a pair of sidelong members; and
   said assembly includes a pair of pivot fasteners, each of said pivot fasteners extending through a respective one of said sidelong members of said frame and a respective one of said first lateral side and said second lateral side of said outer wall of said crate for pivotally attaching each of said pair of sidelong members to said outer wall, each of said pivot fasteners being positioned adjacent to said distal end of said respective sidelong member, each of said pivot fasteners engaging said outer wall of said crate at a point located proximate an intersection between said bottom wall of said crate and said front side of said outer wall of said crate.

3. The assembly according to claim 1, wherein:
   said frame comprises a central member extending between a pair of sidelong members, each of said sidelong members being spaced apart from each other and being perpendicularly oriented with said central member, said central member extending outwardly beyond each of said pair of sidelong members, each of said pair of sidelong members having a bolt hole extending laterally through a respective sidelong member, said bolt hole associated with each of said sidelong members being positioned closer to a distal end of said respective sidelong member than said central member;
   said crate has a pair of holes extending through an outer wall of said crate; and
   said assembly includes a pair of securing fasteners, each of said securing fasteners being extendable through said bolt hole in a respective one of said sidelong members of said frame and a respective one of said holes in said outer wall of said crate when said frame is in said stored position for retaining said frame in said stored position, said frame being positionable in said deployed position when said pair of securing fasteners is removed from said bolt hole in said respective sidelong member.

4. The assembly according to claim 1, wherein:
   said frame includes a central member;
   each of said plurality of fishing rod holders is positioned on a top surface of said central member of said frame, said plurality of fishing rod holders being spaced apart from each other and being evenly distributed along said central member, each of said fishing rod holders including a saddle for receiving a handle of the fishing rod; and said top surface of said central member is directed upwardly when said frame is in said deployed position.

5. The assembly according to claim 1, wherein:

said carrying member has a pair of first bends being positioned on opposing sides of a middle of said carrying member to define a central portion of said carrying member being perpendicularly oriented with a pair of outward portions of said carrying member;

said carrying member has a pair of second bends being integrated into a respective one of said outward portions to define an upper section of each of said outward portions angling away from a lower section of each of said outward portions, said central portion being associated with said upper section of each of said outward portion;

said lower section of each of said outward portions rests against a back side of an outer wall of said crate having each of said outward portions extending upwardly from said crate;

said upper section of each of said outward portions angles rearwardly from said crate having said central portion being spaced upwardly from said crate; and said assembly includes a center support being coupled between said central portion of said carrying member and said back side of said outer wall of said crate, said center support having a bend being aligned with each of said first bends in said pair of outward portions of said carrying member.

6. The assembly according to claim 1, wherein:

said crate has an outer wall and a bottom wall, said outer wall having a back side and a first lateral side and a second lateral side; and each of said pair of brackets has a first panel being attached to and extending rearwardly from said back side of said outer wall of said crate at a point located adjacent to said bottom wall of said crate, each of said pair of brackets including a second panel extending upwardly and angling rearwardly from said first panel having said second panel being attached to said back side of said outer wall, each of said pair of brackets being positioned adjacent to an intersection between said bottom wall of said crate and a respective one of said first lateral side and said second lateral side of said outer wall of said crate.

7. The assembly according to claim 6, wherein each of said shoulder straps is wrapped around a central portion of said carrying member in a fixed manner, each of said shoulder straps having a lower end being attached to a connection point integrated into said first panel of a respective one pair of brackets.

8. A portable rod holder assembly for facilitating a plurality of fishing rods to be supported in a remote location during fishing, said assembly comprising:

a crate having an outer wall defining a storage area in said crate and a bottom wall being configured to be placed upon a support surface, said crate having a pair of holes each extending through a respective one of a first lateral side and a second lateral side of said outer wall, each of said pair of holes being spaced from a top edge of said outer wall at a point located proximate a front side of said outer wall;

a bucket being positionable in said storage area in said crate for transporting said bucket, said bucket being comprised of a fluid impermeable material wherein said bucket is configured to be filled with water to facilitate a fish to be contained in the water;

a lid being positionable on said bucket for closing said bucket, said lid having a ring extending around a perimeter of said lid, said ring releasably engaging a top edge of said bucket for retaining said lid on said bucket;

a cushion being applied to said lid wherein said cushion is configured to be sat upon by a user, said cushion being comprised of a resiliently compressible material wherein said cushion is configured to enhance comfort for the user, said cushion having a bottom surface being bonded to an upper surface of said lid having said cushion completely covering said upper surface;

a frame being pivotally attached to said crate, said frame being positionable in a stored position having said frame extending upwardly from said crate, said frame being positionable in a deployed position having said frame extending forwardly from said crate, said frame comprising a central member extending between a pair of sidelong members, each of said sidelong members being spaced apart from each other and being perpendicularly oriented with said central member, said central member extending outwardly beyond each of said pair of sidelong members, each of said pair of sidelong members having a bolt hole extending laterally through a respective sidelong member, said bolt hole associated with each of said sidelong members being positioned closer to a distal end of said respective sidelong member than said central member;

a pair of pivot fasteners, each of said pivot fasteners extending through a respective one of said sidelong members of said frame and a respective one of said first lateral side and said second lateral side of said outer wall of said crate for pivotally attaching each of said pair of sidelong members to said outer wall, each of said pivot fasteners being positioned adjacent to said distal end of said respective sidelong member, each of said pivot fasteners engaging said outer wall of said crate at a point located proximate an intersection between said bottom wall of said crate and said front side of said outer wall of said crate;

a pair of securing fasteners, each of said securing fasteners being extendable through said bolt hole in a respective one of said sidelong members of said frame and a respective one of said holes in said outer wall of said crate when said frame is in said stored position for retaining said frame in said stored position, said frame being positionable in said deployed position when said pair of securing fasteners is removed from said bolt hole in said respective sidelong member;

a plurality of fishing rod holders, each of said plurality of fishing rod holders being attached to said frame wherein each of said plurality of fishing rod holders is configured to hold a fishing rod when said frame is positioned in said deployed position, each of said plurality of fishing rod holders being positioned on a top surface of said central member of said frame, said plurality of fishing rod holders being spaced apart from each other and being evenly distributed along said central member, each of said fishing rod holders including a saddle for receiving a handle of the fishing rod, said top surface of said central member being directed upwardly when said frame is in said deployed position;

a carrying member being attached to and extending upwardly from said crate, said carrying member having a pair of first bends being positioned on opposing sides of a middle of said carrying member to define a central portion of said carrying member being perpendicularly oriented with a pair of outward portions of said carrying member, said carrying member having a pair of second bends being integrated into a respective one of said outward portions to define an upper section of each of said outward portions angling away from a lower section of each of said outward portions, said central portion being associated with said upper section of each of said outward portion, said lower section of each of said outward portions resting against a back side of said outer wall of said crate having each of said outward portions extending upwardly from said crate, said upper section of each of said outward portions angling rearwardly from said crate having said central portion being spaced upwardly from said crate;

a center support being coupled between said central portion of said carrying member and said back side of said outer wall of said crate, said center support having a bend being aligned with each of said first bends in said pair of outward portions of said carrying member;

a pair of brackets, each of said pair of brackets being attached to and extending away from said crate, each of said pair of brackets having a first panel being attached to and extending rearwardly from said back side of said outer wall of said crate at a point located adjacent to said bottom wall of said crate, each of said pair of brackets including a second panel extending upwardly and angling rearwardly from said first panel having said second panel being attached to said back side of said outer wall, each of said pair of brackets being positioned adjacent to an intersection between said bottom wall of said crate and a respective one of said first lateral side and said second lateral side of said outer wall of said crate;

a kidney pad being attached to each of said pair of brackets wherein said kidney pad is configured to rest against a user's back when said crate is being carried by the user, said kidney pad having a back side being attached to a free end of said first panel of each of said brackets; and a pair of shoulder straps, each of said pair of shoulder straps being coupled between said carrying member and said kidney pad wherein each of said pair of shoulder straps is configured to be worn over a respective one of the user's shoulders thereby facilitating said crate and said bucket and said frame to be carried on the user's back in the convention of a backpack, each of said shoulder straps being wrapped around said central portion of said carrying member in a fixed manner, each of said shoulder straps having a lower end being attached to a connection point integrated into said first panel of a respective one pair of brackets.

\* \* \* \* \*